US012624770B2

(12) United States Patent
Tong

(10) Patent No.: US 12,624,770 B2
(45) Date of Patent: May 12, 2026

(54) GAS PANEL ENCLOSURE

(71) Applicant: Applied Materials, Inc., Santa Clara, CA (US)

(72) Inventor: Mingle Tong, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 131 days.

(21) Appl. No.: 18/784,015

(22) Filed: Jul. 25, 2024

(65) Prior Publication Data

US 2026/0029061 A1     Jan. 29, 2026

(51) Int. Cl.
*F16K 27/00*        (2006.01)

(52) U.S. Cl.
CPC ......... *F16K 27/00* (2013.01); *Y10T 137/6525* (2015.04); *Y10T 137/7043* (2015.04)

(58) Field of Classification Search
CPC ........... C23C 16/4408; C23C 16/45561; F16K 27/00; F16K 27/003; F17C 13/12; F17C 2260/036; F17C 2260/037; F17C 2260/038; F17C 2270/0518; F17D 1/04; F17D 5/02; H01J 37/3244; H01J 37/32449; H01J 37/32834; Y10T 137/6525; Y10T 137/6851; Y10T 137/7043; Y10T 137/7062; Y10T 137/8593; Y10T 137/86212; Y10T 137/86228; Y10T 137/86324; Y10T 137/87153; Y10T 137/87885
USPC ... 137/338, 343, 377, 382, 561 R, 574, 576, 137/587, 594, 884
See application file for complete search history.

(56) References Cited

U.S. PATENT DOCUMENTS

| | | | |
|---|---|---|---|
| 6,293,310 B1 | 9/2001 | Redemann | |
| 6,578,600 B1 * | 6/2003 | Young, Jr. ......... | H01L 21/67017 118/715 |
| 10,460,960 B2 | 10/2019 | Kumar | |
| 2002/0011268 A1 * | 1/2002 | Cho .................. | C23C 16/45561 137/377 |
| 2003/0124049 A1 | 7/2003 | Krishnan | |
| 2003/0136446 A1 | 7/2003 | Young | |

(Continued)

OTHER PUBLICATIONS

International Search Report and Written Opinion for International Application No. PCT/US2025/036218, mailed on Feb. 2, 2026, 10 pages.

*Primary Examiner* — Kenneth Rinehart
*Assistant Examiner* — Jonathan J Waddy
(74) *Attorney, Agent, or Firm* — KDW Firm PLLC

(57)        ABSTRACT

Disclosed herein is a gas panel enclosure including a divider plate for separating various components of the gas panel. In one example, a gas panel assembly may include an enclosure defining first, second, and third chambers, wherein the first and third chambers are separated from the second chamber by a divider, wherein the first chamber is connected to an exhaust, and wherein the divider comprises openings permitting fluid flow between the second and first chambers. The assembly may include electrical components within the third chamber, wherein the third and first chambers are separated by an internal wall. The gas panel assembly may further include a gas sticks within the second chamber, wherein the electrical components are separated from the gas stick assembly by the divider and by the internal wall to prevent fluid flow from the second chamber to the third chamber.

20 Claims, 6 Drawing Sheets

(56)  References Cited

U.S. PATENT DOCUMENTS

| | | | | |
|---|---|---|---|---|
| 2014/0137961 A1* | 5/2014 | Kao | ................. | H01L 21/67017 |
| | | | | 137/561 R |
| 2014/0202558 A1* | 7/2014 | Chou | ..................... | F16K 27/12 |
| | | | | 137/377 |
| 2017/0322568 A1* | 11/2017 | Kumar | ............. | H01L 21/67017 |
| 2021/0232115 A1* | 7/2021 | Tu | ........................... | G05B 9/03 |
| 2023/0238253 A1* | 7/2023 | Spyropoulos | ..... | H01J 37/32449 |
| | | | | 137/861 |
| 2024/0032262 A1* | 1/2024 | Comnutt | ........... | H05K 7/20909 |

* cited by examiner

GAS PANEL ENCLOSURE

FIELD OF THE DISCLOSURE

The embodiments of the present disclosure relate to a gas panel assembly of a semiconductor processing system and, in particular, to a gas panel enclosure including a divider plate for separating various components of the gas panel.

BACKGROUND OF THE DISCLOSURE

Semiconductor processing utilizes inert, toxic, corrosive, and flammable gases, which require the use of various operative fluid flow control and fluid filtering devices to ensure that the proper quantity of contaminant free gas reaches a semiconductor process chamber. The operative fluid flow control and filtering devices, for example, are assembled in linear clusters of interconnected elements forming individual gas specific flow control channels, which are sometimes referred to as "gas sticks." Typically, the gas sticks are then mounted to a common manifold, with the entire distribution assembly then mounted to a pallet of a gas panel for handling and maintenance purpose.

There has been a continuous push to reduce operating costs and energy consumption of gas panels. Current gas panel designs include electronic devices, such as an EV manifold, power strips, pressure switches, etc., in a same area as the pallet and the gas sticks. The electronic devices, which can act as ignition sources, therefore have a higher chance of contact with a gas leak mixture before the gas leak mixture is able to be removed via the exhaust.

To mitigate flammable leak concentrations in the gas panel, current approaches employ a higher exhaust flow rate, which may be expensive. Furthermore, current gas panels are inefficient when dealing with leaks, particularly with respect to air speed around vacuum coupling radius (VCR) connections. That is, air speed is low, and tends to circulate about the VCR connection instead of being quickly exhausted.

There remains a need in the art for efficient gas panel leak mitigation.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In one aspect, a gas panel assembly may include an enclosure defining a first chamber, a second chamber, and a third chamber, wherein the first and third chambers are separated from the second chamber by a divider, wherein the first chamber is connected to an exhaust, and wherein the divider comprises a first plurality of openings permitting fluid flow between the second chamber and the first chamber. The gas panel assembly may further include a plurality of electrical components within the third chamber, wherein the third chamber is separated from the first chamber by an internal wall. The gas panel assembly may further include a gas stick assembly within the second chamber, wherein the plurality of electrical components is operable to control gas flow from the gas stick assembly to a substrate processing chamber, and wherein the plurality of electrical components is separated from the gas stick assembly by the divider and by the internal wall to prevent fluid flow from the second chamber to the third chamber.

In another aspect, a gas panel assembly of a semiconductor processing system may include an enclosure defining a first chamber, a second chamber, and a third chamber, wherein the first and third chambers are separated from the second chamber by a divider, wherein the first chamber is connected to an exhaust, and wherein the divider comprises a first plurality of openings permitting fluid flow between the second chamber and the first chamber. The gas panel assembly may further include a plurality of electrical components within the third chamber, wherein the third chamber is separated from the first chamber by an internal wall. The gas panel assembly may further include a gas stick assembly within the second chamber, wherein the plurality of electrical components is operable to control gas flow from the gas stick assembly to a substrate processing chamber, and wherein the plurality of electrical components is separated from the gas stick assembly by the divider and by the internal wall to prevent fluid flow from the second chamber to the third chamber.

In yet another aspect, an apparatus for delivering gases to a substrate processing chamber may include an enclosure defining a first chamber, a second chamber, and a third chamber, wherein the first and third chambers are separated from the second chamber by a divider, wherein the first chamber is connected to an exhaust, wherein the third chamber is separated from the first chamber by an internal wall, and wherein the divider comprises a first plurality of openings permitting fluid flow between the second chamber and the exhaust. The apparatus may further include a plurality of electrical components within the third chamber and a gas stick assembly within the second chamber, wherein the plurality of electrical components is operable to control gas flow from the gas stick assembly to the substrate processing chamber, and wherein the plurality of electrical components is separated from the gas stick assembly by the divider and by the internal wall to prevent fluid flow from the second chamber to the third chamber.

BRIEF DESCRIPTION OF THE DRAWINGS

The accompanying drawings illustrate exemplary approaches of the disclosure, including the practical application of the principles thereof, as follows.

Figure 1:
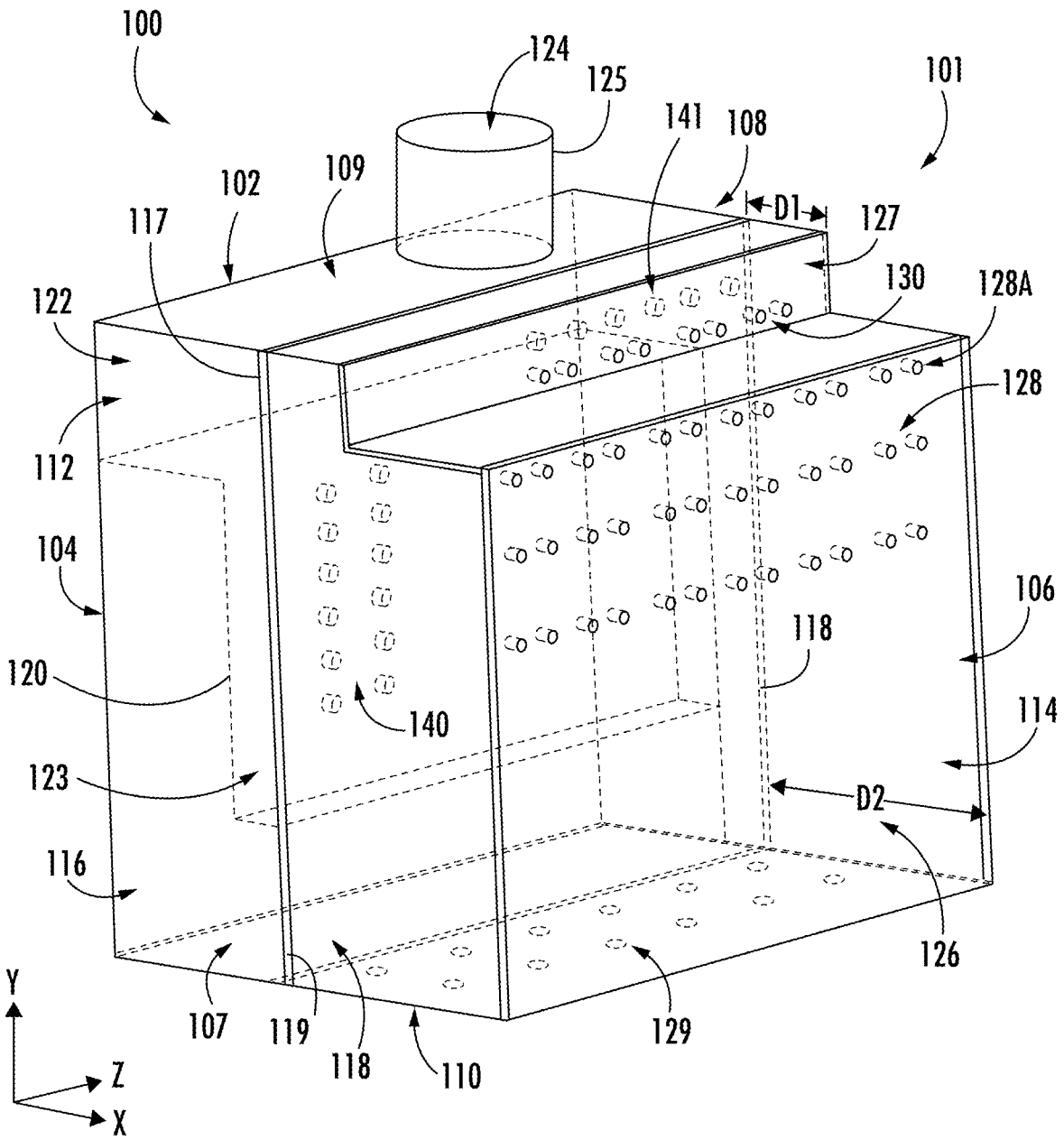
FIG. 1 illustrates a perspective view of a gas panel assembly, according to embodiments of the present disclosure.

The drawings are not necessarily to scale. The drawings are merely representations, not intended to portray specific parameters of the disclosure. The drawings are intended to depict exemplary embodiments of the disclosure, and therefore are not to be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DETAILED DESCRIPTION

Apparatuses, systems, and devices in accordance with the present disclosure will now be described more fully hereinafter with reference to the accompanying drawings, where various embodiments are shown. The apparatuses, systems, and devices may be embodied in many different forms and are not to be construed as being limited to the embodiments set forth herein. Instead, these embodiments are provided so the disclosure will be thorough and complete, and will fully convey the scope of the methods to those skilled in the art.

To address the deficiencies of the prior art described above, disclosed herein is a gas panel assembly having increased exhaust efficiency. Electrical components may be placed in an electrical chamber, while gas flow components may be placed in a gas pallet chamber. The two chambers may be separated/isolated from each other by a divider plate. By isolating major electrical components from the gas flow components, the chance of flammable contact between an ignition source and gas leak is reduced. This design also reduces total air volume to the exhaust, thus increasing air exchange times/flow rate while decreasing costs.

In some embodiments, air vent holes and exhaust holes are located close to a VCR connector, which is one of the components more prone to leakage in the gas panel. As such, gas leakage can be more quickly directed to exhaust, without circulating around the entire gas panel prior to being removed.

Furthermore, in some embodiments, additional exhaust holes may be provided under the gas flow components, with corresponding vent holes positioned towards a top of the gas panel enclosure. As a result, air within the gas panel enclosure is swept past each gas stick. If any leaks are present in the area of the gas sticks, the gas will be sucked out directly to the exhaust chamber through exhaust holes. In addition, with such an arrangement, flow turbulence is reduced and circulation inside the gas panel enclosure is increased.

Figure 2:
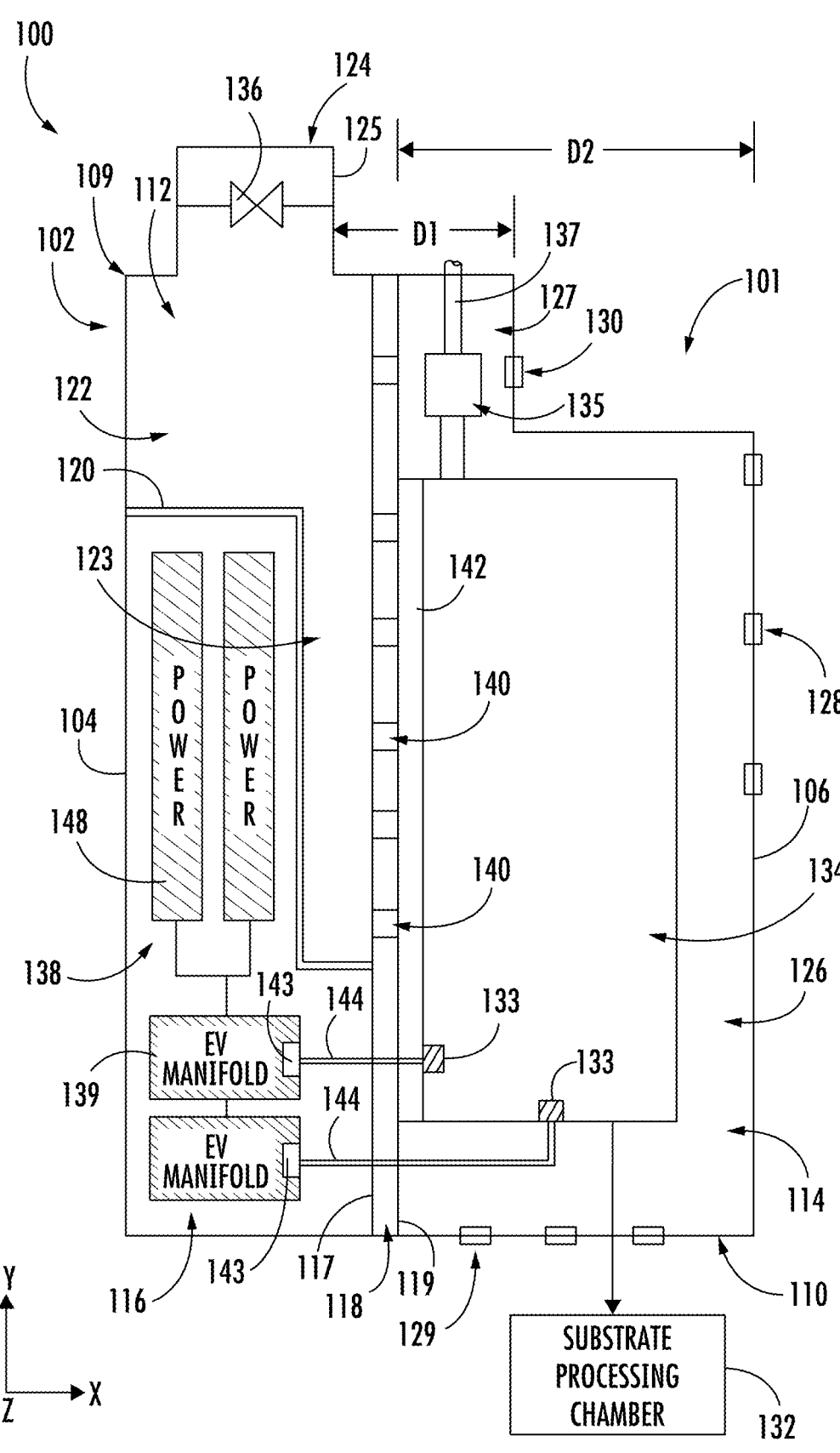
FIG. 2 illustrates a side view of the gas panel assembly, according to embodiments of the present disclosure.

FIGS. 1-2 illustrate a gas panel assembly 100 (hereinafter "assembly") of a system according to embodiments of the disclosure. As shown, the assembly 100 may include a gas panel 101 including a housing or enclosure 102. The gas panel 101 may be used for the delivery of various gases, including flammable and toxic gases used during manufacture of microelectronic devices. All of the functionalities and components of the gas panel assembly 100 will not be described or depicted herein. Instead, only those functions and components of the gas panel 101 most beneficial to understand the teachings of the present principles herein will be discussed.

The enclosure 102 may include a plurality of perimeter walls configured as a first main wall 104 opposite a second main wall 106, a first wall 107 opposite a second wall 108, and an upper end wall 109 opposite a lower end wall 110. The plurality of perimeter walls may define a first chamber 112, a second chamber 114, and a third chamber 116. The first chamber 112 and the third chamber 116 may be separated from the second chamber 114 by a divider 118, wherein the divider is designed to allow fluid flow through the enclosure 102 for enabling the mitigation of high concentration levels of flammable and toxic gases. As shown, the divider 118 may be plate, which extends between the upper end wall 109 and the lower end wall 110, and between the first wall 107 and the second wall 108. The divider 118 generally extends parallel to a plane (e.g., y-z plane) defined by the first main wall 104 and a plane defined by the second main wall 106. The perimeter walls of the enclosure 102 assist in sealing the enclosure 102 to assist in maintaining a sub atmospheric pressure inside the gas panel 101.

The first chamber 112 may be defined by the first main wall 104, a first side 117 of the divider 118, the upper end wall 109, the first wall 107, and the second wall 108. The first chamber 112 may be further defined by an internal wall 120. Although non-limiting, the internal wall 120 may extend between the divider 118 and the first main wall 104, and between the first and second walls 107, 108. The internal wall 120 may define the first chamber 112 into an upper section 122 and a lower section 123. The upper section 122 may be in fluid communication with an exhaust 124, the exhaust 124 including an exhaust duct 125 extending from the upper end wall 109 of the enclosure 102. The lower section 123 is in fluid communication with the upper section 122, and may extend substantially vertically (e.g., in the y-direction) between the first side 117 of the divider 118 and the internal wall 120.

In some embodiments, the exhaust duct 125 may include a shutoff/isolation valve 136 to control fluid flow through the exhaust 124. When the shutoff/isolation valve 136 is open and a pump (not shown) of the exhaust 124 is active/ON, fluid such as air and gas within the enclosure 102 is generally drawn towards the exhaust duct 125 and removed, as will be described in greater detail herein. In some embodiments, the pump may be used to adjust the rate of exhaustion of the fluid from the exhaust duct 125. For example, in the case a gas leak is detected within the enclosure 102, the exhaustion rate may be increased.

The second chamber 114 may be defined by the second main wall 106, a second side 119 of the divider 118, the upper end wall 109, the lower end wall 110, the first wall 107, and the second wall 108. The second chamber 114 may have a main section 126 and an upper section 127 extending from the main section 126. As shown, the upper section 127 may define a vertical channel extending towards the upper end wall 109 of the enclosure 102, wherein a first dimension 'D1' (e.g., in the x-direction) of the upper section 127, between the divider 118 and the second main wall 106, is less than a second dimension 'D2' (e.g., in the x-direction) of the main section 126, between the divider 118 and the second main wall 106. The relatively smaller volume of the upper section 127 of the second chamber 114 helps to confine gas leaks and air flow therein. In some embodiments, the upper section 127 may enclose one or more vacuum coupling radius (VCR) fittings or connections 135 (FIG. 2), which are connected to the gas sticks.

As better shown in FIG. 2, the second chamber 114 may house a variety of gas flow components, such as a gas stick assembly 134 having one or more valves, filters, mass flow controllers (MFCs) and/or other components to flow one or more gases into a substrate processing chamber 132. In some embodiments, the gas stick assembly 134 may include one or more pneumatic valves 133 operable to receive a flow of clean dry air (CDA) from one or more manifolds 139 of the third chamber 116. Each manifold 139 may be an electronic vacuum (EV) manifold including an electric contactor and one or more electrical valves 143 operable to control the flow of the CDA delivered into one or more supply lines 144, which may be polyethylene pneumatic tubing connected to the second chamber 114. The pneumatic valves 133 of the gas stick assembly 134 may open/close based on the CDA pressure from the supply lines 144, thereby controlling gas flow to the substrate processing chamber 132.

Referring again to FIGS. 1-2, the gas stick assembly 134 may be coupled to the divider 118 by a supporting plate 142. The second chamber 114 may further include a plurality of vent holes or openings operable to receive a fluid (e.g., air) from an exterior of the enclosure 102. For example, a first plurality of openings 128 may be provided through the second main wall 106 of the main section 126, a second plurality of openings 129 may be provided through the lower end wall 110, and a third plurality of openings 130 may be provided through the second main wall 106 of the upper section 127. It will be appreciated that the number and placement of the first, second, and third plurality of openings 128, 129, 130 is shown for illustrative purposes only, unless specifically noted, and may vary in alternative embodiments.

In some embodiments, the first plurality of openings 128 is provided adjacent the gas stick assembly 134, and may provide ambient air to an area surrounding each gas stick of the gas stick assembly 134. An upper row 128A of the first plurality of openings 128 may deliver an "air curtain" proximate the VCR connections 135, wherein the air curtain is a layer or stream of air directed between an upper portion of the gas stick assembly 134 and the VCR connections 135. The air curtain may act as a barrier to prevent leaks within the upper section 127 from diffusing back towards the main section 126 the second chamber 114.

The second plurality of openings 129 are provided beneath the gas stick assembly 134, and may deliver ambient air between the lower end wall 110 and the upper end wall 109 of the enclosure 102. Meanwhile, the third plurality of openings 130 may be provided through one or more exterior walls defining the upper section 127 of the second chamber 114. The third plurality of openings 130 may provide additional air in an area surrounding the VCR connections 135, as will be described in greater detail herein.

The third chamber 116, which may be located within the second chamber 114, is defined by the first main wall 104, the first side 117 of the divider 118, the lower end wall 110, the first wall 107 and the second wall 108. The third chamber 116 may be further defined by the internal wall 120. As shown, the third chamber 116 may not extend entirely to the upper end wall 109 of the enclosure 102. In some embodiments, the third chamber 116 is devoid of significant venting or exhaust openings. As best shown in FIG. 2, a plurality of electrical components 138 are located within the third chamber 116, and may be separated from the gas stick assembly 134 by the internal wall 120 and by the divider 118. Although not exhaustive, the plurality of electrical components 138 may include the EV manifolds 139, one or more a power sources 148 (e.g., DC power strip) for distributing electrical power to the EV manifolds 139, and one or more pressure switches (not shown). In some embodiments, the plurality of electrical components 138 may further include an electronic receiver and a transmitter for providing communication to control gas flow from the gas stick assembly 134 to the substrate processing chamber 132 by, for example, opening/closing one or more the pneumatic valves 133 associated with each gas stick. By isolating these major electrical components from the gas flow components in the second chamber 114, the chance of contact between an ignition source and a flammable gas is reduced.

In the embodiment shown, the divider 118 may include a fourth plurality of openings 140 and a fifth plurality of openings 141 extending between the first and second sides 117, 119 thereof. The fourth and fifth plurality of openings 140, 141 provide fluid flow between the second chamber 114 and the first chamber 112. Although not limited to any particular number or placement, the fourth plurality of openings 140 may be positioned proximate the gas stick assembly 134 to exhaust any leaks surrounding the gas stick assembly 134 together with the air received from the first plurality of openings 128. Meanwhile, the fifth plurality of openings 141 may be positioned proximate the VCR connections 135 to more efficiently exhaust any leaks to the exhaust 124 without circulating the gas around the main section 126 of the second chamber 114 prior to being removed.

Figure 3:
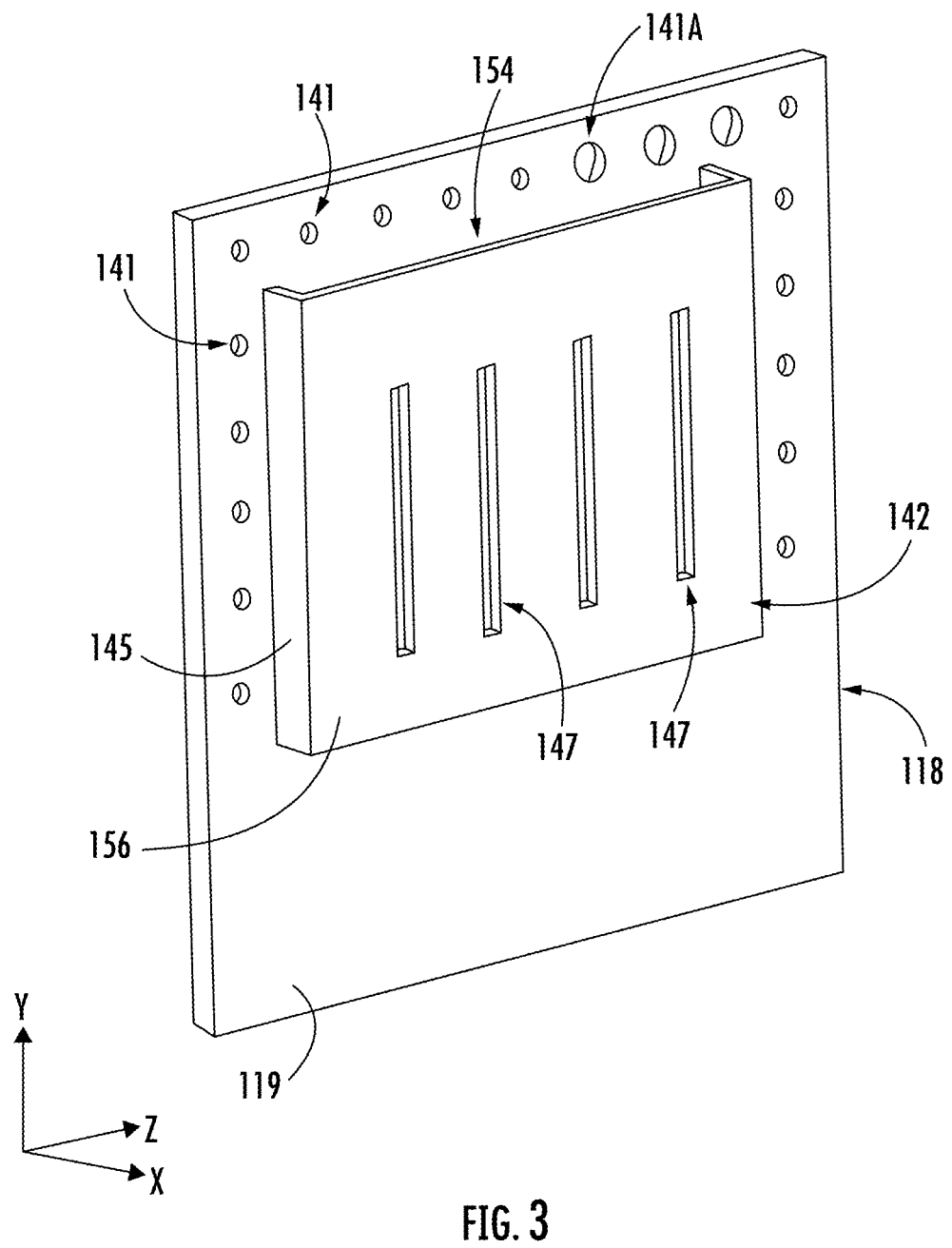
FIG. 3 illustrates a perspective view of a divider and supporting plate of the gas panel assembly, according to embodiments of the present disclosure.

FIG. 3 demonstrates the divider 118 and the supporting plate 142 in greater detail. The supporting plate 142 may include hardware (not shown) for coupling to the gas stick assembly 134 thereto. In some embodiments, the supporting plate 142 may include a main wall 156 and a set of sidewalls 145 connected with the main wall 156, wherein the set of sidewalls 145 may extend perpendicularly from the second side 119 of the divider 118. The main wall 156, the set of sidewalls 145, and the second side 119 of the divider 118 define a plenum 154. As shown, the supporting plate 142 may be open at a top and/or bottom thereof to permit increased air flow through the plenum 154

In some embodiments, the main wall 156 may include one or more vents 147 operable to receive ambient air from the first plurality of openings 128 of the second main wall 106. The vents 147 may be located between adjacent rows of gas sticks of the gas stick assembly 134 to direct air and any gas leaks from the gas stick assembly 134 into the plenum 154. Although each of the vents 147 is demonstrated as a substantially vertical slot extending primarily in the y-direction, other opening shapes and sizes are possible in alternative examples.

As further shown, the fifth plurality of openings 141 may be positioned above/outside the supporting plate 142 to increase fluid flow through the divider 118, particularly in the area of the VCR connections 135. In some embodiments, a subset 141A of the fifth plurality of openings 141 may have a relatively larger area to further ensure any leaks from the VCR connections 135 or the gas stick assembly 134 are more efficiently delivered to the exhaust 124.

Figure 4:
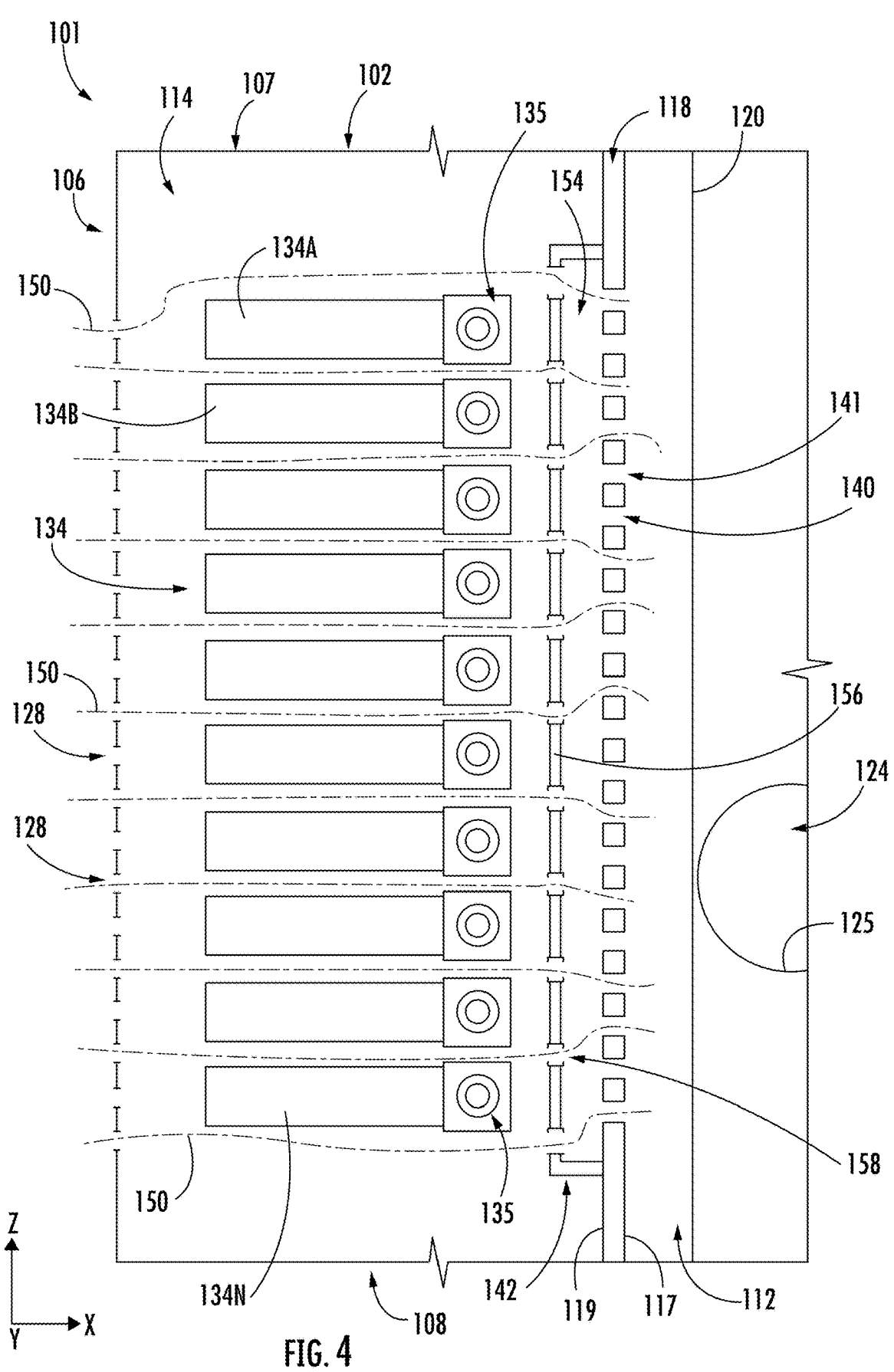
FIG. 4 illustrates a top view of a portion of the gas panel assembly, according to embodiments of the present disclosure.

FIG. 4 is a top view of the gas panel 101 during operation, according to embodiments of the present disclosure. As shown, the gas stick assembly 134 may include a plurality of gas sticks 134A-134N located within the second chamber 114. Each of the plurality of gas sticks 134A-134N provides a flow path and includes one or more ports. Although not shown, various fluid processing devices, such as valves, purifiers, filters, pressure transducers, pressure regulators, moisture scrubbers, mass flow controllers, etc., are fastened to adjacent ports in each respective gas stick and pass the process gas or the other gas along the flow path. Coupled to each of the plurality of gas sticks 134A-134N is a corresponding VCR connection 135. An inlet conduit 137 of each VCR connection 135 may receive a process gas into a conduit. The conduit(s) can be any suitable tubing or plumbing, either rigid or flexible, to move the process gas. A greater or lesser number of gas sticks and VCR connections may be present in alternative embodiments.

During use, ambient air 150 may enter the first plurality of openings 128 along the second main wall 106 of the enclosure 102. The air 150 may pass around/between each of the plurality of gas sticks 134A-134N, towards the divider 118. In some embodiments, a portion of the air 150 may first enter the plenum 154 before being delivered to the divider 118. The air 150 may then pass through the fourth plurality of openings 140 and the fifth plurality of openings 141 of the divider 118. After passing through the divider 118, the air 150 enters the first chamber 112, where it is then removed from the gas panel 101 via the exhaust 124.

Figure 5:
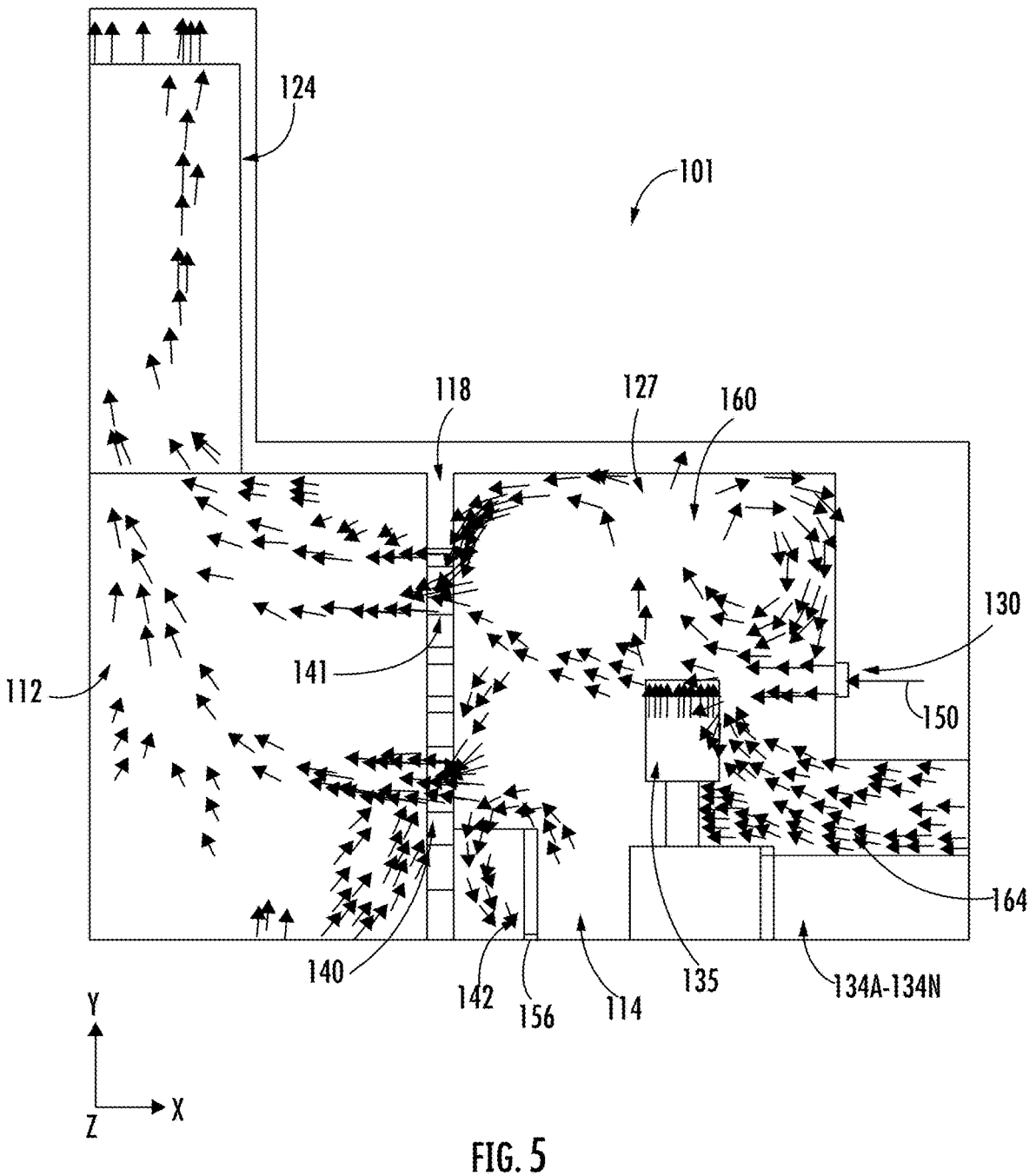
FIG. 5 illustrates velocity flow vector contour map for a portion of the gas panel assembly, according to embodiments of the present disclosure.

FIG. 5 is a close-up, side view of the gas panel 101 further illustrating an example fluid flow. Shown is an area surrounding the VCR connections 135, as VCR connectors are prone to leaks. In this embodiment, the VCR connections 135 may extend into the upper section 127 of the second chamber 114, and the third plurality of openings 130 are located proximate the VCR connections 135. The third plurality of openings 130 therefore deliver the air 150 directly towards an upper portion of the VCR connections 135 at a relatively high velocity. Any gas leaking from the VCR connections 135 is brought towards the fifth plurality of openings 141 of the divider 118 together with the air 150. In some cases, the air 150 and the gas circulates within an upper end 160 of the upper section 127 of the second chamber 114 before being delivered to the fifth plurality of openings 141.

Furthermore, an air curtain 164 formed between the plurality of gas sticks 134A-134N and an upper wall 166 of the main section 126 of the second chamber 114 helps ensure all, or most, of the air 150 and the gas within the upper section 127 is delivered to the fourth or fifth plurality of openings 140, 141 without being delivered into the main section 126 of the second chamber 114. The relatively higher velocity of fluid flowing through the fourth and fifth plurality of openings 140, 141 further ensures that the air 150 and the gas is drawn into the first chamber 112 and removed via the exhaust 124.

Figure 6:
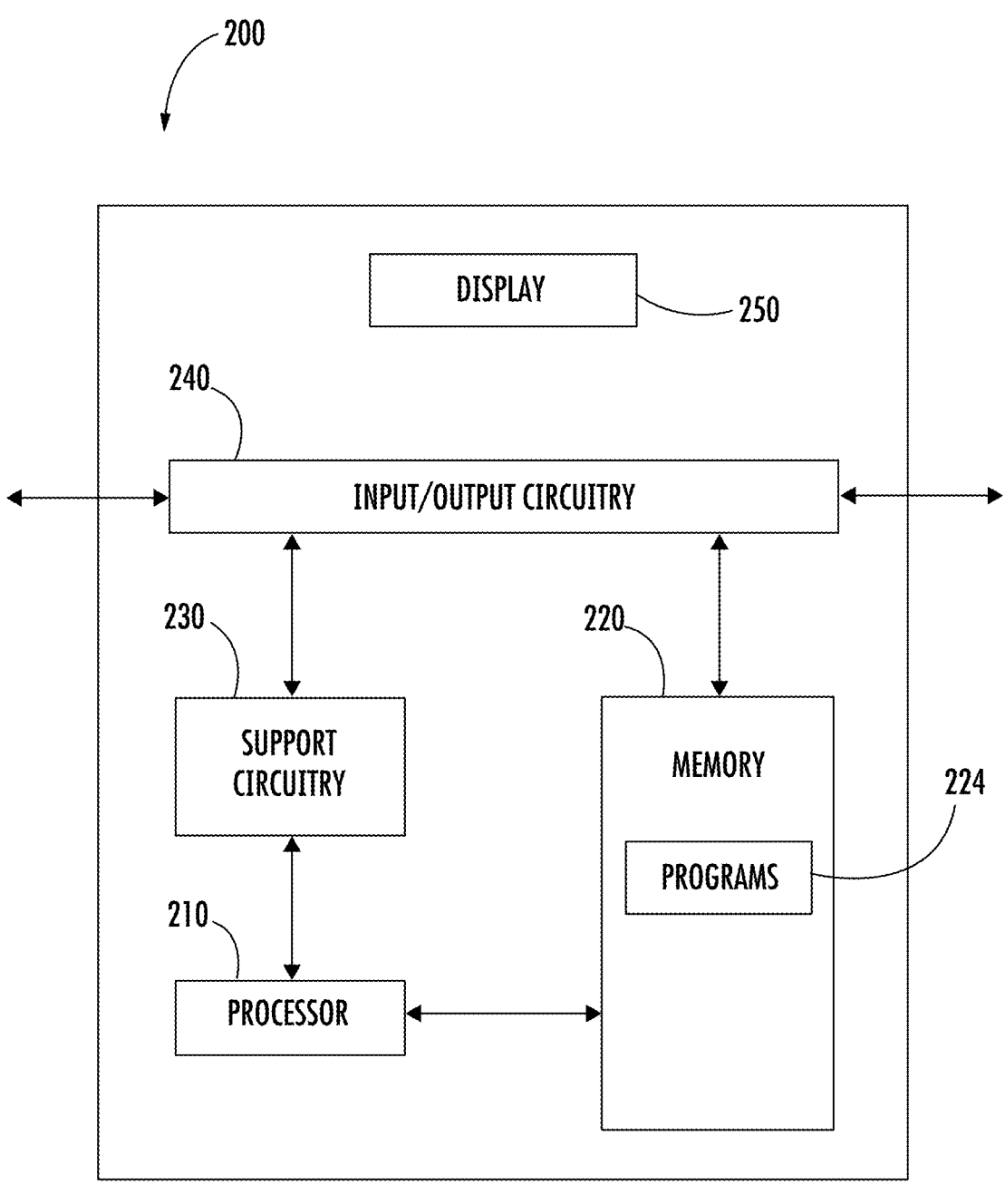
FIG. 6 depicts a high-level block diagram of a controller suitable for use in the gas panel assembly, according to embodiments of the present disclosure.

FIG. 6 depicts a high-level block diagram of a controller 200 suitable for use in the gas panel assembly 100 described herein. The controller 200 may include a processor 210 as well as a memory 220 for storing control programs 224, buffer pools and the like. The processor 210 cooperates with support circuitry 230 such as power supplies, clock circuits, cache memory and the like, as well as circuits that assist in executing the software routines/programs stored in the memory 220. As such, some of the process steps discussed herein may be implemented within software and/or hardware, for example, as circuitry that cooperates with the processor 210 to perform various steps. In some embodiments, during operation, the controller 200 communicates with, for example, the gas stick assembly 134 and the plurality of electrical components 138 to control distribution of gas from the gas stick assembly into the substrate processing chamber, and to control operation of the exhaust 124.

The controller 200 also contains input-output circuitry 240 that forms an interface between the various functional elements communicating with the controller 200. As depicted, the controller 200 can further include a display 250.

Although the controller 200 is depicted as a general-purpose computer, the controller 200 is programmed to perform various specialized control functions in accordance with the present principles, and embodiments can be implemented in hardware, for example, as an application specified integrated circuit (ASIC). As such, the process steps described herein are intended to be broadly interpreted as being equivalently performed by software, hardware, or a combination thereof.

In some embodiments, an optional leak/gas sensor can be used to detect a gas leak in the interior portion of the gas panel 101. For example, in the case that a gas is leaking from one of the gas sticks 134A-134N and/or the VCR connections 135, a signal can be communicated to the controller 200, which in turn may communicate a signal to, for example, a purge module controlling the exhaust 124. A rate of the exhaustion of gases from the gas panel 101 can be increased by increasing a speed of the exhaust pump to more quickly rid the interior portion of the gas panel 101 of the leaked gas. For example, the controller 200 may communicate a signal to the exhaust pump to increase a speed of the exhaust pump to evacuate the leaked gas from the first and second chambers 112, 114. In one non-limiting embodiment, the exhaust pump can be run at maximum or near maximum speed to exhaust the leaked gas from the gas panel 101 as quickly as possible.

Once the leaked gas has been evacuated from the interior portion of the gas panel 101, for example after a calculated time period and/or in response to a signal from the leak/gas sensor, a signal can be communicated from the controller 200 to return the speed of the exhaust pump to a normal operating speed to maintain the relatively lower pressure in the gas panel 101, which will consume less energy.

In some embodiments, if the gas leak in the gas panel 101 persists, as sensed by the leak/gas sensor, the operation of the gas panel 101 may be stopped and the delivery of the gas to be delivered by the gas panel 101 may be shut off. That is, if after a predetermined amount of time, the leak/gas sensor continues to detect leaked gas, the controller 200 can communicate a signal to the gas panel 101 to shut down the operation of the gas panel and stop the delivery of all gases to the gas panel 101. As such, the gas panel 101 can be serviced.

For the sake of convenience and clarity, terms such as "top," "bottom," "upper," "lower," "vertical," "horizontal," "lateral," and "longitudinal" will be used herein to describe the relative placement and orientation of components and their constituent parts as appearing in the figures. The terminology will include the words specifically mentioned, derivatives thereof, and words of similar import.

As used herein, an element or operation recited in the singular and proceeded with the word "a" or "an" is to be understood as including plural elements or operations, until such exclusion is explicitly recited. Furthermore, references to "one implementation" of the present disclosure are not intended as limiting. Additional implementations may also incorporate the recited features.

Furthermore, the terms "substantial" or "substantially," as well as the terms "approximate" or "approximately," can be used interchangeably in some implementations, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

The present disclosure is not to be limited in scope by the specific implementations described herein. Indeed, other various implementations of and modifications to the present disclosure, in addition to those described herein, will be apparent to those of ordinary skill in the art from the foregoing description and accompanying drawings. Thus, such other implementations and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A gas panel assembly, comprising:
an enclosure defining a first chamber, a second chamber, and a third chamber, wherein the first and third chambers are separated from the second chamber by a divider, wherein the first chamber is connected to an exhaust, and wherein the divider comprises a first plurality of openings permitting fluid flow between the second chamber and the first chamber;
a plurality of electrical components within the third chamber, wherein the third chamber is separated from the first chamber by an internal wall; and
a gas stick assembly within the second chamber, wherein the plurality of electrical components is operable to control gas flow from the gas stick assembly to a substrate processing chamber, and wherein the plurality of electrical components is separated from the gas stick assembly by the divider and by the internal wall to prevent fluid flow from the second chamber to the third chamber.

2. The gas panel assembly of claim 1, wherein the internal wall extends between the divider and a plurality of perimeter walls defining the enclosure.

3. The gas panel assembly of claim 2, wherein the enclosure comprises:
the plurality of perimeter walls surrounding the first, second, and third chambers, wherein the exhaust extends through a first wall of the plurality of perimeter walls; and
a second plurality of openings through a second wall of the plurality of perimeter walls, wherein the second plurality of openings is operable to receive a fluid from an exterior of the enclosure.

4. The gas panel assembly of claim 3, wherein a third plurality of openings is provided through a third wall of the plurality of perimeter walls, wherein the third wall partially defines an upper section of the second chamber.

5. The gas panel assembly of claim 4, further comprising a seal connector coupled to an inlet conduit, wherein the seal connector extends into the upper section of the second chamber, wherein the gas stick assembly is coupled to the seal connector, and wherein the gas stick assembly is positioned within a main section of the second chamber.

6. The gas panel assembly of claim 1, the plurality of electrical components comprising a manifold and a power source for supplying power to the manifold.

7. The gas panel assembly of claim 6, wherein the manifold comprises one or more electrical valves operable to control a flow of air delivered to one or more supply lines, and wherein the gas stick assembly comprises one or more pneumatic valves operable to control the flow of air received via the one or more supply lines.

8. The gas panel assembly of claim 1, wherein the gas stick assembly is coupled to the divider by a supporting plate.

9. A gas panel assembly of a semiconductor processing system, the gas panel assembly comprising:

an enclosure defining a first chamber, a second chamber, and a third chamber, wherein the first and third chambers are separated from the second chamber by a divider, wherein the first chamber is connected to an exhaust, and wherein the divider comprises a first plurality of openings permitting fluid flow between the second chamber and the first chamber;
a plurality of electrical components within the third chamber, wherein the third chamber is separated from the first chamber by an internal wall; and
a gas stick assembly within the second chamber, wherein the plurality of electrical components is operable to control gas flow from the gas stick assembly to a substrate processing chamber, and wherein the plurality of electrical components is separated from the gas stick assembly by the divider and by the internal wall to prevent fluid flow from the second chamber to the third chamber.

10. The gas panel assembly of claim 9, wherein the enclosure comprises:
a plurality of perimeter walls surrounding the first, second, and third chambers, wherein the exhaust extends through a first wall of the plurality of perimeter walls;
a second plurality of openings through a second wall of the plurality of perimeter walls, wherein the second plurality of openings is operable to receive a fluid from an exterior of the enclosure; and
a third plurality of openings provided through a third wall of the plurality of perimeter walls, wherein the third wall partially defines an upper section of the second chamber.

11. The gas panel assembly of claim 10, further comprising a seal connector coupled to an inlet conduit, wherein the seal connector extends into the upper section of the second chamber, wherein the gas stick assembly is coupled to the seal connector, and wherein the gas stick assembly is positioned within a main section of the second chamber.

12. The gas panel assembly of claim 9, the plurality of electrical components comprising a manifold and a power source for supplying power to the manifold.

13. The gas panel assembly of claim 12, wherein the manifold comprises one or more electrical valves operable to control a flow of air delivered to one or more supply lines, and wherein the gas stick assembly comprises one or more pneumatic valves operable to control the flow of air received via the one or more supply lines.

14. The gas panel assembly of claim 9, wherein the gas stick assembly is coupled to the divider by a supporting plate.

15. An apparatus for delivering gases to a substrate processing chamber, the apparatus comprising:
an enclosure defining a first chamber, a second chamber, and a third chamber, wherein the first and third chambers are separated from the second chamber by a divider, wherein the third chamber is separated from the first chamber by an internal wall, wherein the first chamber is connected to an exhaust, and wherein the divider comprises a first plurality of openings permitting fluid flow between the second chamber and the exhaust; and
a plurality of electrical components within the third chamber and a gas stick assembly within the second chamber, wherein the plurality of electrical components is operable to control gas flow from the gas stick assembly to the substrate processing chamber, and wherein the plurality of electrical components is separated from the gas stick assembly by the divider and by the internal wall to prevent fluid flow from the second chamber to the third chamber.

16. The gas panel assembly of claim 15, wherein the enclosure comprises:

a plurality of perimeter walls surrounding the first, second, and third chambers, wherein the exhaust extends through a first wall of the plurality of perimeter walls;

a second plurality of openings through a second wall of the plurality of perimeter walls, wherein the second plurality of openings is operable to receive a fluid from an exterior of the enclosure; and a third plurality of openings provided through a third wall of the plurality of perimeter walls, wherein the third wall partially defines an upper section of the second chamber.

17. The gas panel assembly of claim 16, further comprising a seal connector coupled to an inlet conduit, wherein the seal connector extends into the upper section of the second chamber, wherein the gas stick assembly is coupled to the seal connector, and wherein the gas stick assembly is positioned within a main section of the second chamber.

18. The gas panel assembly of claim 15, the plurality of electrical components comprising a manifold and a power source for supplying power to the manifold.

19. The gas panel assembly of claim 18, wherein the manifold comprises one or more electrical valves operable to control a flow of air delivered to one or more supply lines, and wherein the gas stick assembly comprises one or more pneumatic valves operable to control the flow of air received via the one or more supply lines.

20. The gas panel assembly of claim 15, wherein the gas stick assembly is coupled to the divider by a supporting plate.

* * * * *